March 26, 1935.  W. H. SIPPEL  1,995,823
HEAVY DUTY CASTER
Filed June 23, 1930
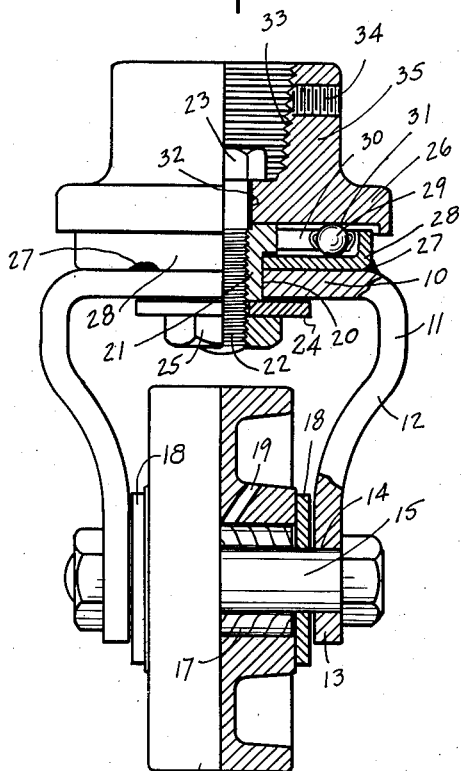
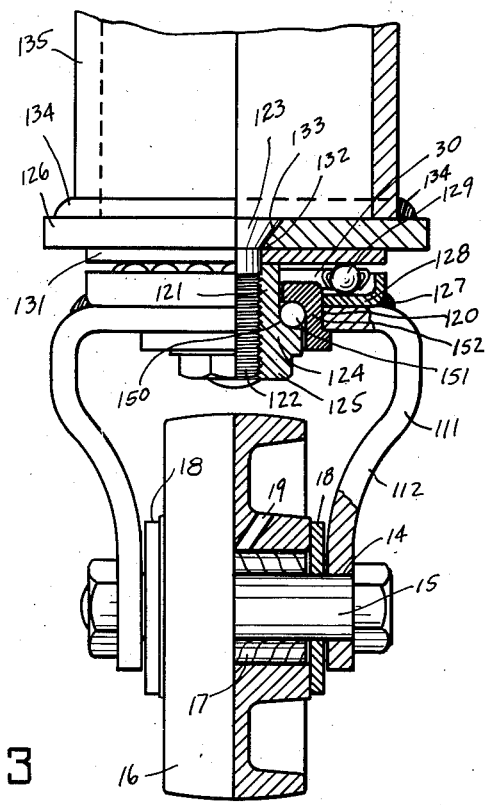
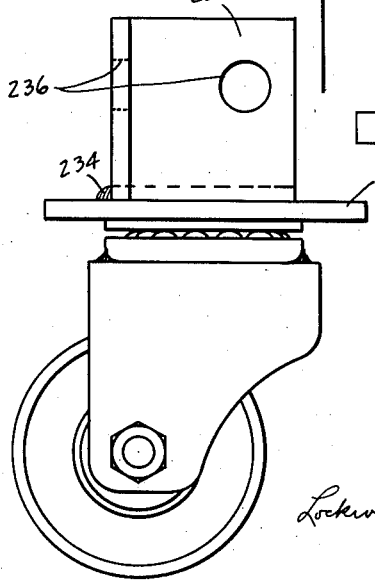
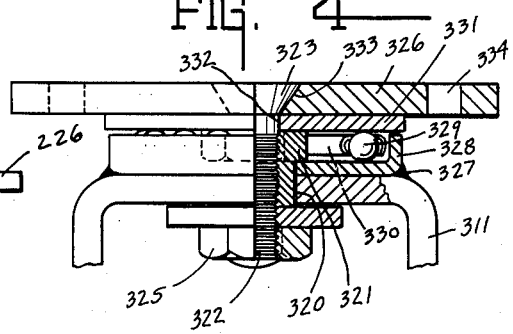
INVENTOR.
WILLIAM H. SIPPEL.
BY
Lockwood Lockwood Goldsmith & Galt
ATTORNEYS.

Patented Mar. 26, 1935

1,995,823

UNITED STATES PATENT OFFICE 1,995,823

HEAVY DUTY CASTER

William H. Sippel, South Bend, Ind.

Application June 23, 1930, Serial No. 463,049

4 Claims. (Cl. 16—21)

This invention relates to a caster construction particularly adaptable for extremely heavy duty.

The chief object of the invention is to provide a heavy duty caster and construct the same from relatively standard parts and in an economical manner.

The full nature of the invention will be understood from the accompanying drawing and the following description and claims:

In the drawing Fig. 1 is a front elevation of a caster construction adapted for insertion into a tubular support, parts being broken away to show the same in quarter section and other parts in detail. Fig. 2 is a similar view of a modified form of the invention wherein a tubular support is illustrated which is adapted for telescopic association for mounting the caster upon a supporting member. Fig. 3 is a side elevation of the caster shown in Fig. 2 but with an angle iron type supporting member for mounting upon an angle iron leg or a square leg as desired.

Fig. 4 is an elevation view of a modified form of yoke and plate connection, parts being broken away in quarter section through the supporting plate and pintle.

In the drawing 10 indicates a yoke which constitutes a heavy standard steel bar. The ends thereof are turned angularly as at 11 and thence inwardly as at 12 towards each other, and thence angularly thereof as at 13 to form a fork having a pair of spaced parallel ears each end being apertured at 14 to receive the axle or bolt 15 which mounts a caster wheel 16. If desired the anti-friction rollers 17 and the side washers 18 may be added. Lubrication may be obtained for the rollers as at 19 if desired.

One feature of the invention consists in the formation of a yoke for a heavy duty caster by forming the same of a heavy standard steel bar. The central portion 10 of the yoke is apertured as at 20 and positionable therein is a spacing bushing 21 which has threaded engagement with the bolt 22. Bolt 22 has the enlarged or headed portion 23 and at its opposite end supports a washer 24 and a nut 25. The bushing maintains a supporting plate 26 in spaced relation to the yoke 10. Suitably secured as indicated at 27 by welding or the like is a cup 28 forming a track plate upon the yoke and a guard for the anti-friction elements 29 in the form of balls maintained in spaced relation by the ball retainer 30. The balls engage the lower surface 31 of the plate 26.

As shown in Fig. 1 supporting plate 26 is apertured as at 32 and the aperture is enlarged as at 33 and in this form of the invention the same is threaded and the plate 26 is adapted to be supported by driving the upwardly extending portion 35 secured thereto and herein shown integral therewith into a tubular member of similar outline. This may be a drive fit or friction engagement, or the tubular member may be secured thereto through a bolt passing through the same and being receivable by the transversely extending threaded opening 34. Also if a solid leg is to be supported the same may be threaded and receivable by the threaded opening 33 and anchored in position by a set screw mounted in threaded opening 34.

In Figs. 2 and 3 of the drawing modified forms of the invention are illustrated. The yoke and caster wheel construction is identical. The supporting plate and anchorage construction, however, is different and also the pivotal connection is different. In Fig. 2 the supporting plate 126 has the central recess 132 which is enlarged by flaring or counter sinking the same as at 133 to receive the tapered head 123 of the bolt 122. The spacing bushing or cone 121, washer 124 and nut 125 herein are all shown integral and have a threaded engagement with the bolt 122. The washer extending portion 124 of the aforesaid cone at its junction with the sleeve portion 121, the same being indicated at 150, constitutes a ball race for antifriction members 151. A stepped collar 152 forms a relatively closed chamber with the spacing construction previously mentioned and retains the balls therein, said spacing collar being receivable by the chamber aperture 120 in the yoke.

Suitably secured as at 127 is the cup shaped plate 128 forming a track plate and guard for the anti-friction balls 129 retained in position by the retainer 30. The balls 129 in the present instance bear upon a track plate 131, interposed between the supporting plate 126 and the cup 128. Suitably secured to the supporting plate 126 as by welding at 134 is a tube 135 which is adapted to telescopically mount the caster upon a leg of complementary conformations.

When the caster is to be mounted upon a square, angular or channel leg the form shown in Fig. 3 is employed and the same includes the supporting plate 226 to which is secured as at 234 the section of angle iron 235 apertured as at 236 for transverse connection to the leg or other structure to be supported by the caster. Angle 235 is preferably welded to the plate.

Fig. 4 illustrates a simple plate anchorage type caster and in this form similar parts bear similar numerals of the three hundred series.

In this form certain features illustrated in Figs. 1 and 2 are combined and certain other features are modified. The conical head 323 of bolt 322 and plate 331 of the form shown in Fig. 2, are combined with the single ball series 329 of Fig. 1. The threaded sleeve 321 and portion 320 are herein illustrated as separable instead of being integral as illustrated in Fig. 2.

The invention claimed is:

1. In a heavy duty caster, the combination of an apertured load supporting member, a centrally apertured plate member therebeneath, a metal plate member therebeneath and in spaced relation thereto, one of said members having a peripheral flange concentrically arranged and directed toward the other member, anti-friction means between the plate members and retained by the flange, a yoke including a flat central portion centrally apertured and suitably secured to the lowermost plate member, a spacing sleeve between the load supporting member and the yoke, and pintle means positioned in the aperture of the load supporting member and in the sleeve for swivably securing the load and supporting member together with the antifriction means included therebetween.

2. In a swivel caster the combination of a yoke comprising a bar having a flat midportion and an aperture therein, a centrally apertured metal cup peripherally and permanently secured to the midportion forming a ball engaging and retaining arrangement, an apertured load supporting member, a centrally apertured metal plate therebeneath, spacing means interposed between the bar midportion and the plate, ball means interposed between the cup and the plate, and pintle means for swivably securing the bar midportion to the load supporting member and mounted in the respective and aligned apertures thereof.

3. In a swivel caster the combination of a yoke comprising a bar having a flat midportion and an aperture therein, a centrally apertured metal cup peripherally and permanently secured to the midportion forming a ball engaging and retaining arrangement, an aperture load supporting member, a centrally apertured metal plate therebeneath, spacing means interposed between the bar midportion and the plate, ball means interposed between the cup and the plate, and pintle means for swivably securing the bar midportion to the load supporting member and mounted in the respective and aligned apertures thereof.

4. In a heavy duty caster, the combination of an apertured load supporting member, a centrally apertured plate member therebeneath, a metal plate member therebeneath and in spaced relation thereto, one of said members having a peripheral flange concentrically arranged and directed toward the other member, antifriction means between the plate members and retained by the flange, a yoke including a flat central portion centrally apertured and suitably secured to the lowermost plate member, a spacing sleeve between the load supporting member and the yoke, pintle means positioned in the aperture of the load supporting member and in the sleeve for swivably securing the load and supporting member together with the anti-friction means included therebetween, another sleeve included within the yoke aperture and interposed between the yoke and the first mentioned sleeve, and other anti-friction means between said sleeves and positioned in the plane of the yoke, said sleeves retaining said second mentioned anti-friction means and said second mentioned sleeve being retained by said pintle means.

WILLIAM H. SIPPEL.